US010969961B2

(12) United States Patent
Kishi et al.

(10) Patent No.: US 10,969,961 B2
(45) Date of Patent: *Apr. 6, 2021

(54) USING VOLUME HEADER RECORDS TO IDENTIFY MATCHING TAPE VOLUMES

(71) Applicant: INTERNATIONAL BUSINESS MACHINES CORPORATION, Armonk, NY (US)

(72) Inventors: Gregory T. Kishi, Oro Valley, AZ (US); Joseph M. Swingler, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/296,664

(22) Filed: Oct. 18, 2016

(65) Prior Publication Data

US 2018/0107401 A1    Apr. 19, 2018

(51) Int. Cl.
*G06F 3/06* (2006.01)

(52) U.S. Cl.
CPC .......... *G06F 3/0608* (2013.01); *G06F 3/0641* (2013.01); *G06F 3/0686* (2013.01); *G06F 3/0665* (2013.01)

(58) Field of Classification Search
CPC ..... G06F 3/0608; G06F 3/0629; G06F 3/0641
See application file for complete search history.

(56) References Cited

U.S. PATENT DOCUMENTS

| 5,732,265 A | 3/1998 | Dewitt et al. |
| 6,467,060 B1 | 10/2002 | Malakapalli et al. |
| 7,567,188 B1 | 7/2009 | Anglin et al. |
| 8,131,924 B1* | 3/2012 | Frandzel ............... G06F 3/0608 711/111 |
| 8,762,349 B2 | 6/2014 | Jayaraman et al. |
| 8,775,390 B2 | 7/2014 | Anglin et al. |
| 9,384,254 B2 | 7/2016 | Tekade et al. |
| 9,396,071 B1 | 7/2016 | Akanda et al. |
| 2006/0195652 A1* | 8/2006 | Lundeby ............... G06F 9/4401 711/111 |
| 2009/0193223 A1* | 7/2009 | Saliba .................... G06F 3/0608 711/216 |
| 2013/0339316 A1 | 12/2013 | Hirsch et al. |
| 2015/0010143 A1 | 1/2015 | Yang |
| 2015/0019505 A1* | 1/2015 | Aronovich ........ G06F 17/30156 707/692 |

(Continued)

OTHER PUBLICATIONS

List of IBM Patents or Patent Applications Treated as Related dated Oct. 19, 2016 (2 pages).

(Continued)

*Primary Examiner* — Michelle T Bechtold
(74) *Attorney, Agent, or Firm* — Griffiths & Seaton PLLC

(57) ABSTRACT

Various embodiments are provided for identifying matching tape volumes for data deduplication in an automated data storage library by a processor. N most similar tape volumes in a tape library may be matched according to a data indication provided in each volume header of the N most similar tape volumes for performing a data deduplication operation on a reduced block of compressed data between the N most similar tape volumes, wherein N is a positive integer.

14 Claims, 7 Drawing Sheets

(56) References Cited

U.S. PATENT DOCUMENTS

2015/0058294 A1* 2/2015 Akirav .............. G06F 17/30156
707/640
2017/0123711 A1 5/2017 Kathpal

OTHER PUBLICATIONS

Simha, "RPE: The Art of Data Deduplication," Dept of Computer Science, Stonybrook University, Sep. 9, 2011 (52 pages).

* cited by examiner

USING VOLUME HEADER RECORDS TO IDENTIFY MATCHING TAPE VOLUMES

BACKGROUND OF THE INVENTION

Field of the Invention

The present invention relates in general to computing systems, and more particularly to, various embodiments for using volume header records to identify matching tape volumes in an automated data storage library using a computing processor.

Description of the Related Art

Data storage libraries provide a means of storing large amounts of data for host computer systems. Automated data storage libraries are known for providing cost effective storage and retrieval of large quantities of data, typically from data storage cartridges stored in storage slots of the library. The libraries typically comprise large numbers of data storage media that are stored in storage shelves, numbers of data storage drives to read and write data with respect to the data storage media, one or more robot accessors to access the data storage media to move the data storage media between the storage shelves and data storage drives, and control units to control the operation of the library and control the flow of data and information between the library and host computer systems. The data storage cartridges are typically extracted from the storage slots, placed in the storage slots, and transported within the library by one or more accessors.

SUMMARY OF THE INVENTION

Various embodiments are provided for using volume header records to identify matching tape volumes in an automated data storage library by a processor. N most similar tape volumes in a tape library may be matched according to a hint (e.g., data indication or data hint) provided in each volume header of the N most similar tape volumes for performing a data deduplication operation on a reduced block of compressed data between the N most similar tape volumes, wherein N is a positive integer.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
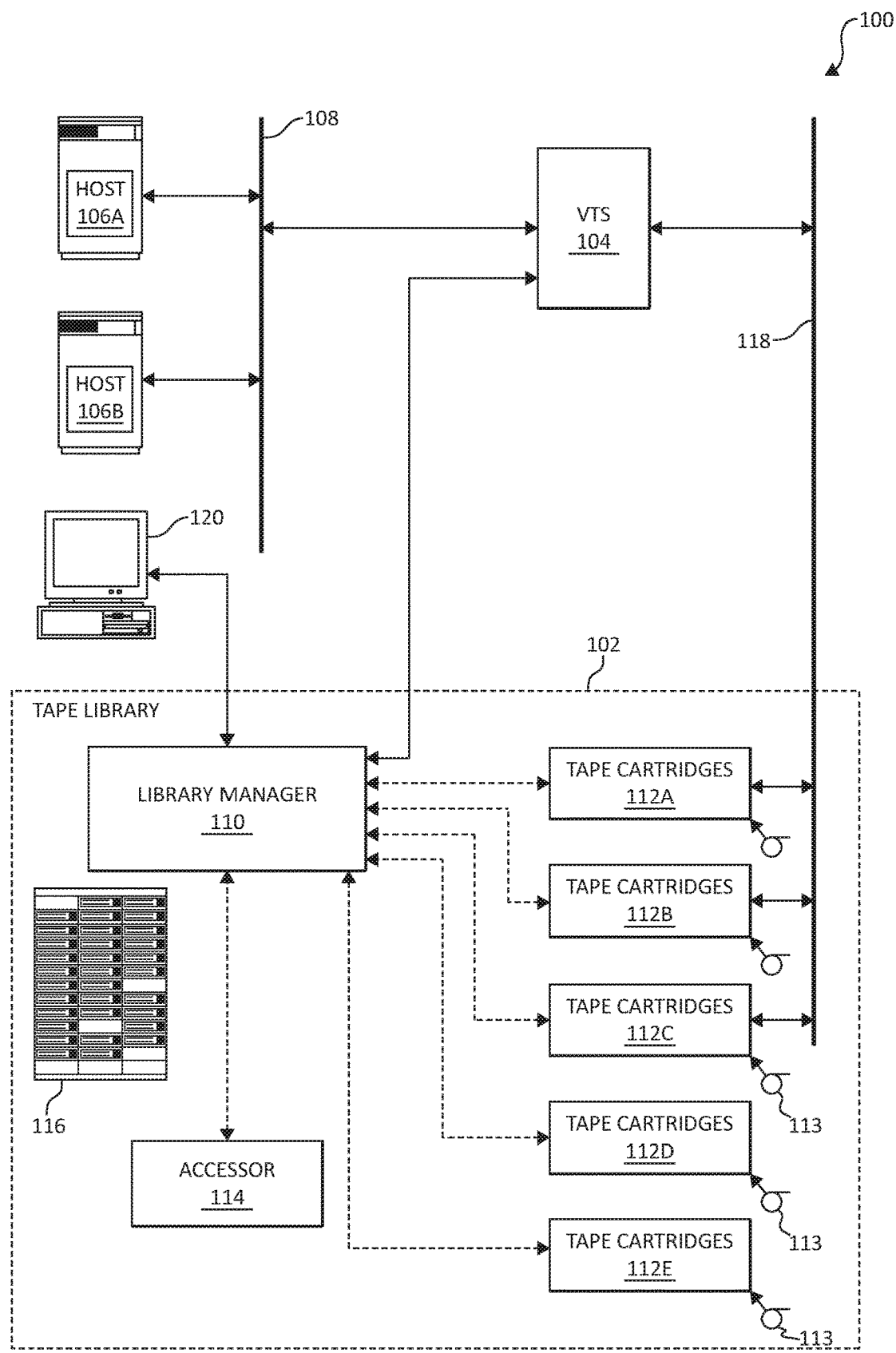
FIG. 1 illustrates an exemplary embodiment of a representative virtual tape system.

As previously stated, automated data storage libraries provide a means for storing large quantities of data on data storage media that are not permanently mounted in data storage drives, and that are stored in a readily available form on storage shelves or slots. One or more robot accessors retrieve selected data storage media from storage shelves and provide them to data storage drives. Typically, data stored on data storage media of an automated data storage library, once requested, is needed quickly.

More specifically, magnetic tape may be used to store a large volume of data, such as to back up information stored in a hard disk, because of the large memory capacity. However, since access speed to magnetic tape is relatively low, a virtual-tape storage server ("VTS") (hereinafter referred to as a VTS or a virtual tape server) in which a hard disk that can be accessed at a higher speed may be used instead of magnetic tape as a storage medium of a host computer. The virtual tape server enables access to a storage medium at a higher speed than a physical tape unit by virtually emulating a tape unit on a hard disk connected to a host system.

The virtual tape server (VTS) may virtualize a tape volume, and the tape volume on the VTS handled by a host application is present in the VTS as a logical volume (also referred to as LVOL, a logical tape volume, or a virtual tape volume). The logical volume may be present in a disk device, under the control of the VTS, called a cache serving as a virtual storage region or in a physical tape library also under the control of the VTS. The logical volume present in the cache is transferred (hereinafter referred to as "migrate" or "migration") to a physical tape volume (hereinafter referred to as a physical volume) in the physical tape library if the LVOL is not referred to for a long time or in accordance with a storage management policy.

In one aspect, virtual tape servers, such as the IBM® TS7700, may include a disk cache subsystem which may be installed with a variety of different physical disk drive media (DDM). This encompasses different physical drive types, capacities, manufacturers, rotational speeds, etc. The virtual tape system may also store virtual tape images as files. Because of the nature of tape systems, in particular those run from a TS7700 series z/OS® operating software system, the identity of each tape cartridge (e.g., volume serial number or "volser") or "volser labels" of the virtual tapes provide no correlation to the contents of the tape cartridge, such as when a host writes to one or more random scratch tapes. Without any correlation between the volser (label) and the contents of the tape cartridge, the volser fails to provide any indication of which virtual tape is a good match to perform data deduplication, particularly where data deduplication is performed against the entire corpus of stored data.

Thus, a needs exists for a low computation, small memory footprint method of matching volsers for data deduplication between at least two volsers. Once at least two volsers are matched, a data deduplication operation may be performed.

In one aspect, a weak hash function on a selected block of streamed data from a host such that the selected block of streamed data with the weak hash function is further compressed to a reduced block of compressed data. N most similar tape volumes in a tape library may be matched according to the weak hash function for performing a data deduplication operation on the reduced block of compressed data between the N most similar tape volumes, wherein N is a positive integer. The weak hash function is a 16 bit hash function value and/or a cyclic redundancy check ("CRC").

In one aspect, the weak hash may be used to "chop" data records into chunks and may be computed on the chunk. The weak hash may be used to determine matching tape volumes without accessing or requiring the actual data in the tape volumes. The weak hash may be used as a single identifier for an entire tape volume and a determination operation may be performed to identify a match between two tape volumes. That is, a matching operation may be performed to identify and match at least two tape volumes that are most likely to deduplicate (or most similar in order to deduplicate) against each other in the tape library for the selected block of streamed data (e.g., the two tape volumes are at least 50% likely to allow deduplication against each other in the tape library).

In one aspect, "similar" or "similarity" as pertaining to similar tape volumes, may be a function of a similarity threshold; and determining one or more differences between the first data and/or first tape volume(s) and the identified similar remote data and/or remote tape volume(s), wherein, once similar remote data and/or remote tape volume(s) have been identified, differences (if any) between the first data and/or the first tape volume(s) and the identified similar remote data and/or remote tape volume(s) may be determined without transmitting all of the first data and/or first tape volume(s) to the remote location and without transmitting all of the identified similar remote data and/or remote tape volume(s) to a first or selected location.

In an additional example, similarity may indicate an amount of data matching greater than a selected threshold or percentage (e.g., greater than 25%) that is expected between two segments of data. In an additional embodiment, similarity may not be transitive (e.g., if A is similar to B and B is similar to C then A is similar to C). Rather, similarity may be defined as merely identifying a "closest match" without any regard to selected threshold and/or percentage. Said differently, similarity is simply identifying a most similar match (such as most similar data) between at least two tape volumes that are identified for data deduplication against each other. For example, if file and/or tape volume A is a closest match (e.g., most similar or "alike") to file and/or tape volume B and file and/or tape volume B is closest matched to file and/or tape volume C, this does not mean that file and/or tape volume A is closest matched to file and/or tape volume C (because it is closest matched to B and B is not C).

In an additional aspect, storage efficiency in virtual tape server storage systems may be increased through data deduplication using a stream of 4 kilobytes (KB) CRC values, which may be generated by an adapter firmware, as weak hash values across a selected size of data sections, such as 4K data sections, of each data record received from a host to protect and accelerate data. Moreover, a smaller size of data for the file may be chunked, selected, or sliced to further reduce the data, such as 4K data sections, for storage in the tape cartridge. The 16 bits may be the weak hash function (e.g., 16 bit CRC values) for each 4K block for the file may be matched against a unique tape cartridge and/or volsers label. The data deduplication may be performed for the 4K data sections of each data record on the identified unique tape cartridge according to the weak hash function. Data deduplication may be achieved in tape cartridges by the reduction in data by using a volume header record to search for (user) hints (e.g., data indications or data hints) to improve CRC matching.

For example, assume a file in a tape library is at least 1 gigabyte (GB) of data. The file may have a plurality of 4K data sections stored in a tape volume of a tape library. Every 4K bytes of data, 16 bits of CRC data may be applied to each 4K chunk of data. Said differently, 16 bits of CRC data are included and maintained after every 32,000 bits (e.g., 8 bits per byte). A CRC file may be collected of each 16 bits of CRC for each tape volume. Thus, the reduced CRC file of a plurality of 16 bits (e.g., 250,000 of the 16 bit CRCs) of CRC applied to a tape volume may be compared to a reduced CRC file of a plurality of 16 bits of CRC applied to an alternative tape volume. Thus, the tape volume with the most similar reduced CRC files may be determined as the most similar. However, such an approach may be impractical and resource and memory intensive by trying to compare all 250,000 of the 16 bit CRC values. In other words, the 250,000 of the 16 bit CRC values can be one of 64,000 different numbers.

A histogram may be created for the 250,000 of the 16 bit CRC values for the tape volume. The hash numbers of the histogram that are most often present or identified may be used as the signature for identification or "representation for comparison" of the tape volume. In one aspect, the top 256 numbers that are most often counted or appearing in frequency may be retained as the signature. Each alternative tape volume having the most similar or most common numbers of the histogram of the alternative tape volume may be identified as "most similar" to the histogram of the first or original tape volume for the matching.

To further assist a matching operation, the mechanisms of the embodiment may also analyze a tape volume header for CRC matching. In this way, data deduplication is improved by reducing a number of tape volumes that are to be considered using a volume header record to search for matching tape volumes and/or search for hints (e.g., user hints) for CRC matching.

FIG. 1 illustrates an exemplary embodiment of a representative virtual tape system 100, in accordance with the present invention. The system 100 includes a tape library 102, at least one VTS 104, and at least one host 106 (shown as 106A and 106B). Each host 106 may be a mainframe computer. Alternatively, the host (users) 106 may be servers or personal computers using a variety of operating systems. The host 106 and the VTS 104 are connected via a storage area network (SAN) 108 or another suitable communications channel.

The tape library 102 may include a library manager 110, one or more data drive devices, which may be tape cartridges 112 (shown as 112A-E), an accessor 114, and a plurality of mountable media 116. In one embodiment, the mountable media 116 includes tape cartridges, magnetic disks, optical disks, CDs, DVDs, other devices that can store data and be mounted to a drive unit, and the like. The library manager 110, which includes at least one computing processor, may be interconnected with and may control the actions of the tape cartridges 112 and the accessor 114. The library manager 110 may include one or more hard disk drives (not shown) for memory storage, as well as, a control panel or keyboard (not shown) to provide user input. The control panel may be a computer in communication with the library manager 110 so that a user can control the operating parameters of the automated tape library 102 independently of one or more hosts 106.

In FIG. 1, five tape cartridges 112A, 112B, 1120, 112D, and 112E are shown. The present invention is operable with one or more tape drives 113. The tape drives 113 are configured for assisting with the mounting and demounting user data and log data. The tape cartridges 112 may share one single repository of mountable media 116. Alternatively, the tape cartridges 112 may utilize multiple repositories of mountable media 116. The tape cartridges 112 may advantageously be distributed over multiple locations to decrease the probability that multiple tape cartridges 112 will be incapacitated by a disaster in one location.

The interconnections between the library manager 110, the tape cartridges 112, and the accessor 114 are shown as dashed lines to indicate that the library manager 110 transmits and receives control signals, rather than data to be stored or retrieved, to the tape cartridges 112 and/or the accessor 114. Data for storage or retrieval may instead be transmitted directly between the VTS 104 and the tape cartridges 112 via a network 118, which may be a storage area network (SAN), local area network (LAN), wide area network (WAN), or another suitable type of network, including the Internet or a direct connection between the VTS 104 and the tape cartridges 112 via a point to point or multi-drop bus connection, for example, a Small Computer Storage Interface (SCSI) interface. Alternatively, control signals for tape drives 112 can be transmitted and received through connections between the VTS 104 and the library manager 110 and the VTS 104 and the tape drives 112 via network 118.

The accessor 114 may be a robotic arm or another mechanical device configured to transport a selected mountable media 116 between a storage bin and tape cartridges 112. The accessor 114 typically includes a gripper and a bar code scanner, or a similar read system, mounted on the gripper. The bar code scanner is used to read a volume serial number (VOLSER) printed on a cartridge label affixed to the tape cartridge 112. In alternative embodiments, the tape cartridges 112 may be replaced by optical disk drives or other magnetic drives. Similarly, the mountable media 116 and the tape drive 113 may include magnetic media, optical media, or any other removable media corresponding to the type of drive employed. A control console 120 may be connected to the library manager 110. The control console 120 may be a computer in communication with the library manager 110 so that a user can control the operating parameters of the tape library 102 independently of the host 106.

Figure 2:
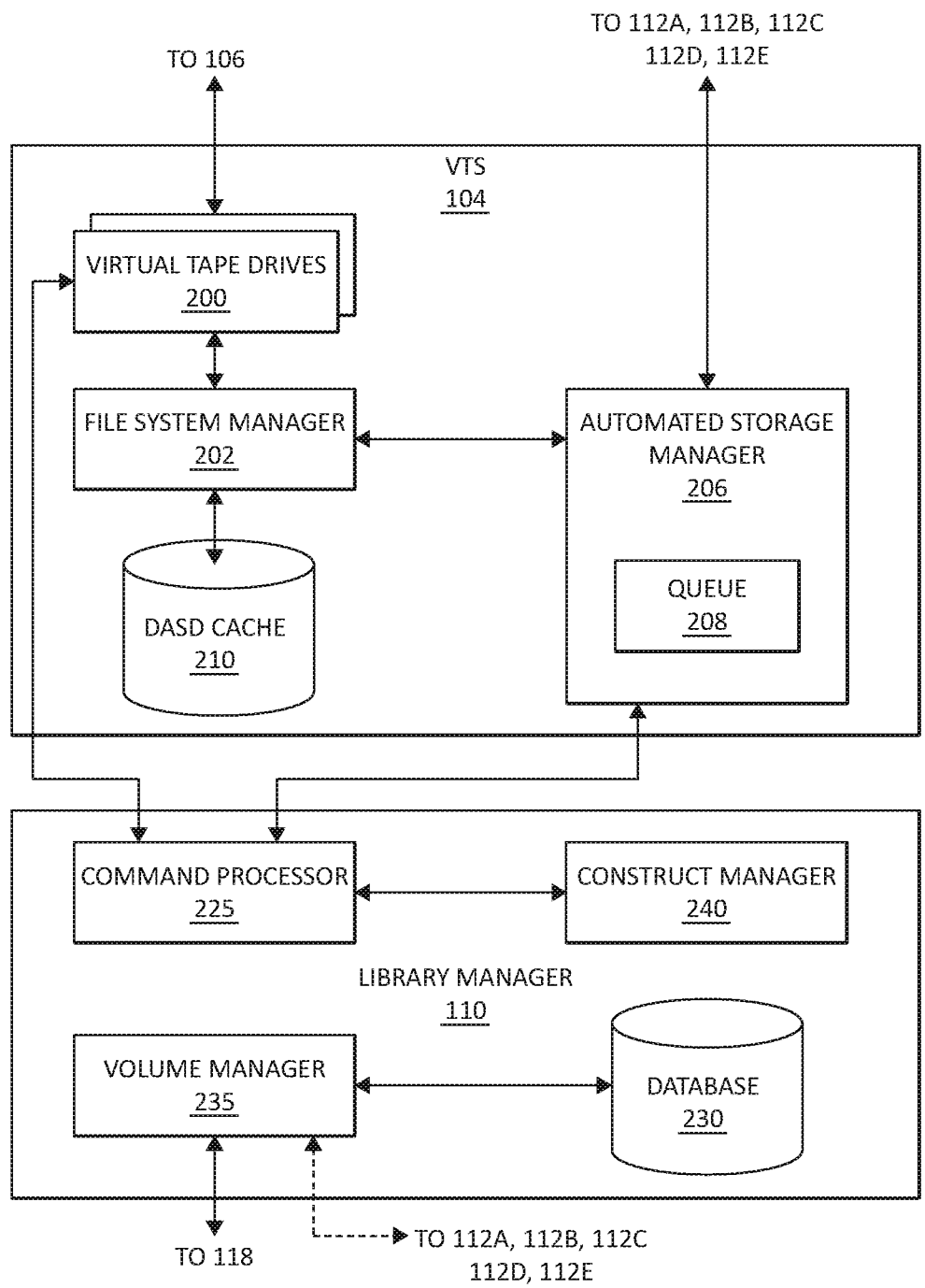
FIG. 2 illustrates an exemplary embodiment of the VTS and library manager.

FIG. 2 illustrates a schematic block diagram depicting one embodiment of the VTS 104 and one embodiment of the library manager 110 of FIG. 1 (such as for flushing data from a cache to a secondary storage). The VTS 104 and the library manager 110 may each take the form of a computer with a bus, processor, memory, and the like. These elements have been omitted from FIG. 2 to more clearly depict the various executable modules and data blocks of the VTS 104 and the library manager 110 pertinent to the invention. There could also be other executable modules and data blocks known in the art in implementing a VTS 104 or library manager 110, but are omitted to focus on the elements essential to the invention.

As shown, the VTS 104 may include a plurality of virtual tape drives 200, a file system manager 202, an automated storage manager 206, a queue 208, and at least one direct access storage device (DASD) cache 210. The DASD cache 210 may take the form of one or more virtual tape drives that contain data in the form of logical, or virtual, volume and may temporarily store data from the host 106 on virtual or logical volumes in the form of files. A write command from the host 106 is processed by the VTS 104, through a virtual tape drive 200 into the DASD cache 210, prior to transferring the updated logical volume from the DASD cache 210 to the mountable media or physical volume 116 (FIG. 1). According to one example, the DASD cache 210 may also take the form of one or more hard disk drives, which may be arranged in a redundant array of independent drives (RAID configuration), such as RAID 5. The virtual tape drives 200 also process control commands from host 106.

The file system manager 202 manages and coordinates data storage in the DASD cache 210. The automated storage manager 206 controls the interface communications between the file system manager 202 and the tape cartridges 112. The automated storage manager 206 also controls communications between the VTS 104 and the library manager 110. In one embodiment, the host 106 may request a particular logical volume. The automated storage manager 206 determines whether the logical volume is in the DASD cache 210. If it is not, the automated storage manager 206 requests a recall for it from the physical volume or mountable media 116. The automated storage manager 206 may also contain a queue 208 for temporarily placing additional recall requests to be processed. Thus, the automated storage manager 206 is an apparatus for recalling logical volumes from mountable media 116 by means of the tape cartridges 112 A, B, C, D, and E (FIG. 1).

The library manager 110 manages the virtual and physical volumes as well as the constructs. More specifically, the library manager 110 includes the command processor 225 that receives control commands from the virtual tape drives 200 and the automated storage manager 206. The command processor 225 passes instructions about the management of the virtual and physical volumes to the volume manager 235. The volume manager 235 stores information about the virtual and physical volumes on a database 230 of the library manager 110. In addition, depending on the instructions received, the volume manager sends instructions to the tape cartridges 112 and/or the accessor 114 to load or "mount" the cartridges or other mountable media 116 on which copies of the virtual volume are to be made or retrieved. Mounting of multiple cartridges 116 may be generally simultaneous or in a certain order, depending on the configuration of the accessor 114 and the tape cartridges 112.

The library manager 110 also has a construct manager 240 that receives user instructions from the control console 120 regarding the volume management actions to be followed for a given construct name. The volume management actions are stored and retrieved by the construct manager 240 on a database 230 of the library manager 110. For certain control commands received by the command processor 225, the command processor 225 instructs the construct manager 240 to provide the volume management actions for a specific virtual volume. The command processor 225 then passes the returned volume management actions for a specific virtual volume to the automated storage manager 206.

Figure 3:
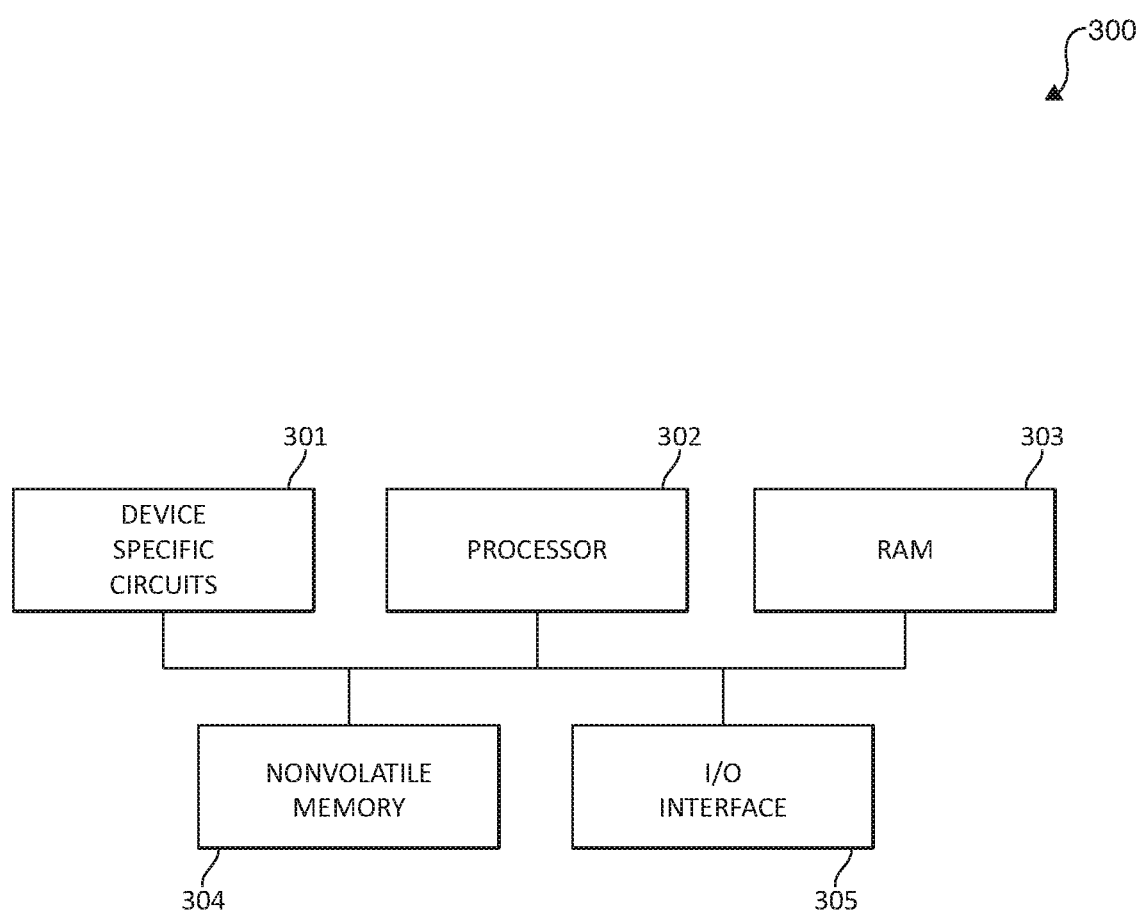
FIG. 3 is a block diagram depicting an exemplary system or controller configuration for use in accordance with an embodiment of the present invention.

FIG. 3 shows a system 300 (e.g., a controller), which may be associated with virtual tape system 100, with a processor 302, RAM (Random Access Memory) 303, nonvolatile memory 304, device specific circuits 301, and I/O interface 305. Alternatively, the RAM 303 and/or nonvolatile memory 304 may be contained in the processor 302 as could the device specific circuits 301 and I/O interface 305. The processor 302 may comprise, for example, an off-the-shelf microprocessor, custom processor, FPGA (Field Programmable Gate Array), ASIC (Application Specific Integrated Circuit), discrete logic, or the like. The RAM (Random Access Memory) 303 may be used to hold variable data, stack data, executable instructions, and the like. The nonvolatile memory 304 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 304 may be used to hold the executable firmware and any nonvolatile data. The I/O interface 305 comprises a communication interface that allows the processor 302 to communicate with devices external to the controller. Examples may comprise, but are not limited to, serial interfaces, USB (Universal Serial Bus), Ethernet, or SCSI (Small Computer Systems Interface). The device specific circuits 301 provide additional hardware to enable the system 300 to perform unique functions such as, but not limited to, motor control of a cartridge gripper. The device specific circuits 301 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 301 may reside outside the system 300.

Figure 4:
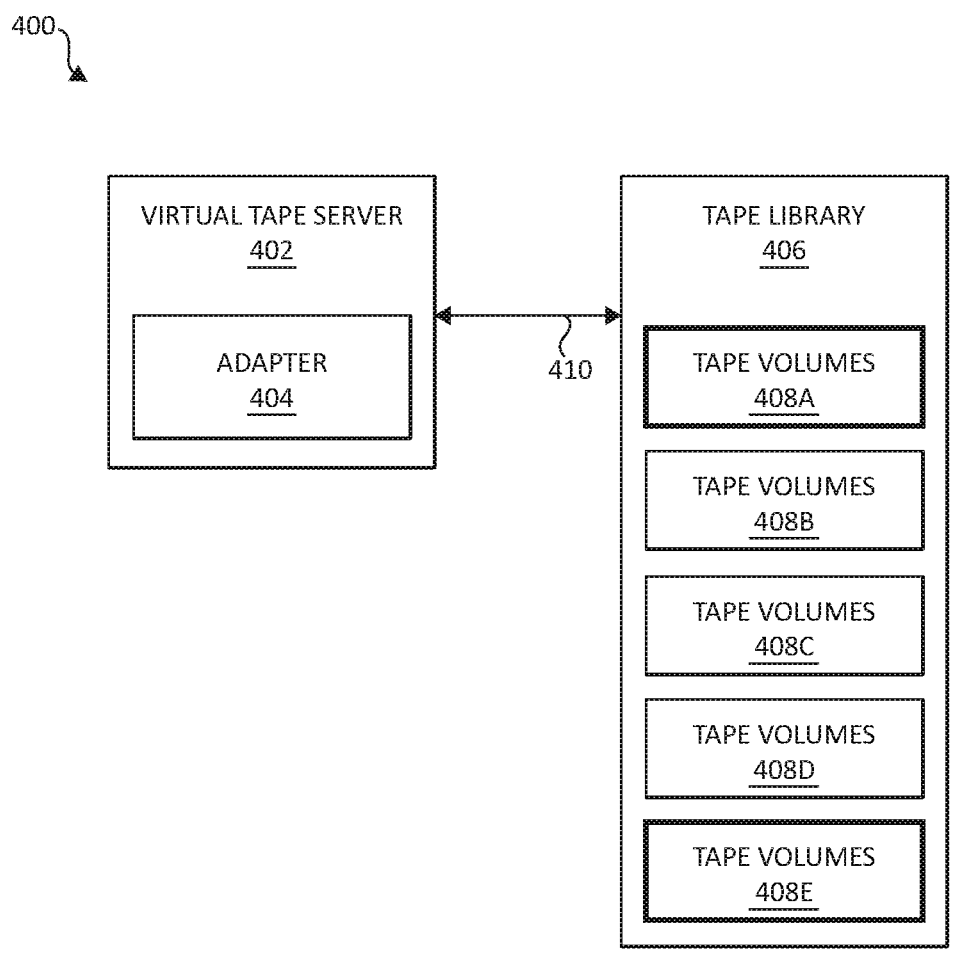
FIG. 4 illustrates a block diagram from identifying matching tape volumes for data deduplication in an automated data storage library in accordance with an embodiment of the present invention.

Turning now to FIG. 4, a block diagram depicting exemplary functional components of a system 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. In one aspect, FIG. 4 may include a virtual tape server 402 in communication with a tape library 406 via an interface 410 each of which may be associated with and/or controlled by a processor and in communication with memory (each of which are not depicted for illustrative convenience), to perform various computational, data processing and other functionality in accordance with various aspects of the present invention. The tape library 406 may include one or more tape volumes 408A-E.

In one aspect, a virtual tape server may receive data from a host, such as a host 106 of FIG. 1, over an interface 410, that receives one or more data records. In one aspect, the virtual tape server 402 may perform a compression on a selected size of blocks of data. The virtual tape server 402 may generate, such as by using an adapter, a CRC on every selected block of data, such as the selected size of blocks of data, after compression. That is, the generation of the CRCs may be performed at full line speed on the selected size of blocks of data after compression. The stream of the selected size of CRCs generated by the virtual tape server (e.g., adapter firmware) may be considered as a weak hash across the selected size of blocks of data of each record. It should be noted that as used herein the selected size of blocks of data may be 4 KBs of block data, by way of example only, but alternative size blocks of data may also be used.

Also, 16 bits (8 bits of data) may be collected for each of the 4K blocks of data for the file. Although, this is a reduction of the 4K blocks of data as a ratio of 1000:1, the reduction is not enough to use as "match" data to identify matching tape volumes for deduplicating the 4K blocks of data. The set of CRCs values for the 16 bits (8 bits of data) may be reduced to a much smaller core of data, as compared to the 16 bits, to be used as "match" data to identify matching tape volumes for deduplicating the 4K blocks of data at high performance.

With the foregoing functional components, in view, such as components of FIGS. 1-4, consider some of the various aspects of the illustrated embodiments. In one aspect, the virtual tape server may perform an inline compression on 4K blocks of data at full line speed, such as by using a FICON adapter by the virtual tape server. The virtual tape server, such as by using an adapter, may generate a CRC on every selected block of data, such as 4K blocks of data, after compression. That is, the generation of the CRCs may be performed at full line speed on the selected size of blocks of data after compression. The stream of 4K CRCs generated by the virtual tape server (e.g., adapter firmware) may be considered as a weak hash across the 4K blocks of data of each record. It should be noted that as used herein "4K" of block data is used by way of example only and alternative size blocks of data may be used.

Also, 16 bits (8 bits of data) may be collected for each of the 4K blocks of data for the file. Although, this is a reduction of the 4K blocks of data as a ratio of 1000:1, the reduction is not enough to use as "match" data to identify matching tape volumes for deduplicating the 4K blocks of data. The set of CRCs values for the 16 bits (8 bits of data) may be reduced to a much smaller core of data, as compared to the 16 bits, to be used as "match" data to identify matching tape volumes for deduplicating the 4K blocks of data at high performance.

The mechanisms of the present invention may reduce the CRC data to a smaller set of data, as compared to the 4K blocks of data, in order to match an N number of tape volumes, where N may be a positive integer and may also be greater than a value of 2. In one aspect, matching of N number of tape volumes can be derived from a set of the N most frequently reported CRC values. This may be performed by sorting and counting the frequency that CRC values are reported in one or more volsers with the most frequent first CRC value and the least frequent last CRC values. The first N CRCs may be retained. That is, the most frequent first N CRC values may be retained and stored. The N CRCs may be stored and embedded in file metadata, a volser database, and/or in a side file. Additionally, the original CRC stream (e.g., the 4K block of CRC) data may be embedded in a file system, such as an automated tape library, with the volser data and/or stored on the side file, where only 0.1% additional storage requirements may be needed.

The most frequent first N CRC values may also be sorted prior to storing the most frequent first N CRC values. The tape volume (e.g., a file in the tape volume) with the most CRC matches may be identified as a matching tape volume. In other words, the matching may only be performed against the CRCs and not the file contents themselves, which increase computing processing speeds and reduces memory usage.

In one aspect, the most frequent first N CRC values may be used as "slicers" that may run back through the sequentially reported CRC stream and store a number of records between any instance of one of the N CRCs that will result in a "chunk" size list. For example, assume that the 2 most frequent CRCs are selected and they had a value of 32 and 747, respectively. An operation is performed by traversing through the CRCs from the front of the volume and determining if the CRC is a 32 or a 747. If the CRC is a 32 or a 747, the sequence count is zeroed. If the CRC is not a 32 or a 747, the sequence count incremented. A series of counts may be obtained that represent sequential blocks of data that had CRCs that were not a 32 or a 747, such as, for example, 20, 2012, 47, 0 and this sequencing would be indicative of the content of the volume. At that point, a comparison operation may be performed to compare the sequences, or histogram the sequences to look for most "similar" other sequences. This list can be compared against other volsers for identifying matching tape volumes.

As an additional or alternative operation, all the CRCs of each file in the tape volumes may be categorized. In other words, the applied CRC values to each 4K block of data stored in each tape volume may be categorized. An N member integer array of the counts of mod(CRC,N) may be built. For example, assume the CRCs are 17, 1, 227, 4, 33, 57. Assume also that N of 2 is selected (in practical application there are thousands of CRCs and N is much bigger than 2 but "less than thousands", such as 256). With N being equal to 2, mod(CRC,2) can be 0 or 1 (the remainder after dividing by N (=2)). So mod(17,2)=1, and so forth. The CRC list becomes 1, 1, 1, 0, 1, 1 and the array is the count of the mod values so the array entry 0 is the number of CRCs where mod(CRC,N) is 0. Entry 1 is the number of CRCs where mod=1 and so forth. Since N equals 2 (e.g., N=2) for this example, array entry 0 has a value of 5 and array entry 1 has a value of 1. Although we lose information by this method, it reduces the number of entries required to track/compare from tens of thousands to hundreds.

The most similar matching tape volumes may be identified and performed by comparing a sum of N number of array count deltas squared between two tape volumes (e.g., a detected change of the data between the 4K block of compressed data and the stored data in the tape volumes). The sum of the square of all N number of data entries for a single file may be calculated into one number.

In one aspect, only the sum of the square of all N number of data entries of each tape volume is compared against another sum of the square of all N number of data entries for identifying the most similar tape volumes. Said differently, the single number may be used as a single identifier for a tape volume to match against other single identifiers of alternative tape volumes. Similarly, the single number can be normalized by dividing the above sum of squares by dividing each delta sum by a total number of entries for a tape volume.

Figure 5:
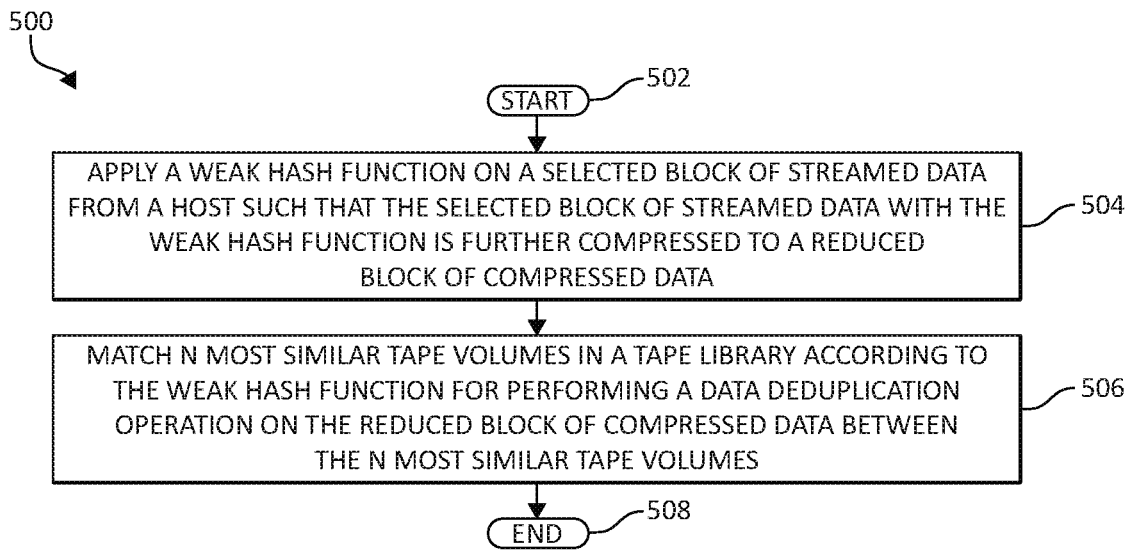
FIG. 5 is a flowchart diagram depicting an exemplary method for identifying matching tape volumes for data deduplication in an automated data storage library.

Turning now to FIG. 5, a method 500 for storing data in an automated data storage library is depicted, in which various aspects of the illustrated embodiments may be implemented. The functionality 500 may be implemented as a method executed as instructions on a machine, where the instructions are included on at least one computer readable medium or on a non-transitory machine-readable storage medium. The functionality 500 may start in block 502. A weak hash function on a selected block of streamed data from a host such that the selected block of streamed data with the weak hash function is further compressed to a reduced block of compressed data, as in block 504. N most similar tape volumes in a tape library may be matched according to the weak hash function for performing a data deduplication operation on the reduced block of compressed data between the N most similar tape volumes, wherein N is a positive integer, as in block 506. The functionality 500 may end in block 508.

In one aspect, in conjunction with and/or as part of at least one block of FIG. 5, the operations of 500 may include each of the following. The operations of 500 may include extracting four kilobytes (KB) of data from data records received from a host as the selected block of streamed data in communication with the virtual tape server. The operations of 500 may include applying a cyclic redundancy check (CRC) value to each of a plurality of reduced blocks of compressed data stored in the tape library to identify the N most similar tape volumes. The frequency of each of the CRC values applied to each of the plurality of reduced blocks of compressed data may be counted and/or sorted to identify most frequent CRC values and least frequent CRC values and in each tape volume. The most frequent CRC values associated with each of the tape volumes may be stored such that the most frequent CRC values are used as a single identifier to identify the N most similar tape volumes.

The operations of 500 may include categorizing each cyclic redundancy check (CRC) value applied to each of a plurality of stored reduced blocks of compressed data in the tape library to identify the N most similar tape volumes. The weak hash function of the reduced block of compressed data may be matched with a most similar categorized CRC value applied to identify the one or more most similar tape volumes.

Figure 6:
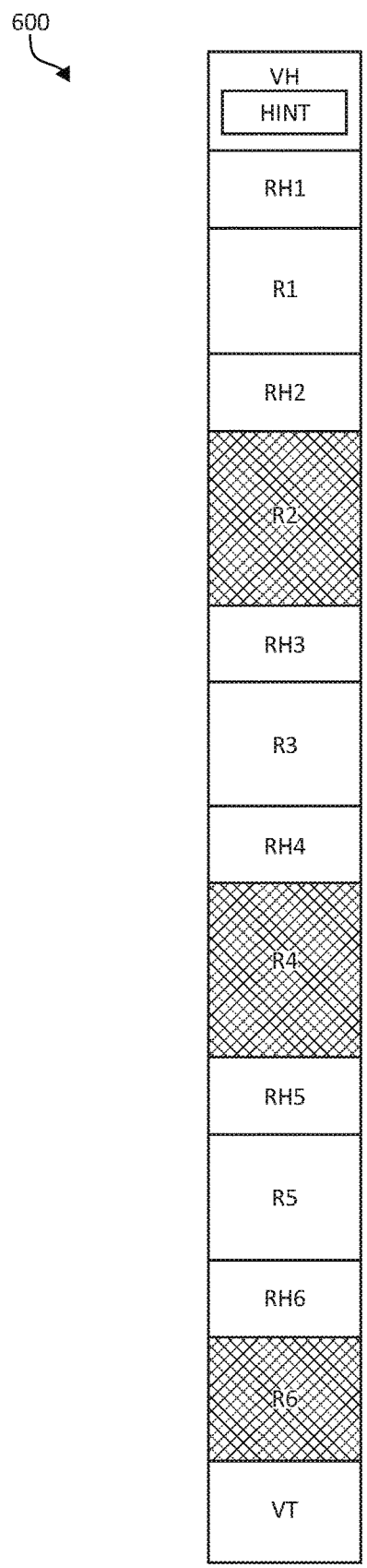
FIG. 6 illustrates a block diagram for using volume header records to search for matching tape volumes in accordance with an embodiment of the present invention.

Turning now to FIG. 6, one example of a virtual tape volume 600 using a volume header record to search for matching tape volumes is illustrated. As shown, the virtual tape volume 500 includes a volume header (VH), one or more records (R1, R2, . . . , R6), one or more record headers (RH1, RH2, . . . , RH6), and a volume trailer (VT). In one aspect, an object (e.g., a dataset, file, etc.) may be made up of one or more records. The volume header (VH) and volume trailer (VT) store metadata about the records in the virtual tape volume 600, including, for example, the volume name, the volume serial number, the number of records in the volume, the size of the records in the volume, the location of the records in the volume, and so forth, among other information. Each record header (RH) may store metadata associated with a specific record (R), such as the record block ID, the record length, the name of key datasets in the tape, and so forth, among other information. Simply stated, the virtual tape volume 600 may be written with a volume identification record, one or more optional volume header records, followed by a tape mark, and followed by the data on the tape. The volume header may be a total of less than 250 bytes and the data after the tape mark may be on the order of a terabyte. In one aspect, the usage of the volume header record is to use a naming convention that indicates either a dataset, datasets, and/or a type of datasets used. The amount of datasets may be reduced for analyzing matches to a much smaller number as opposed to searching all tape volumes, which become more time and resource intensive thereby reducing computing efficiency.

The volume header may be used to search for hints (e.g., user hints) that expedite the CRC matching used to identify matching tape volumes. N most frequent CRC from the volume headers may be collected and counted. The count of N CRC remainders may be collected. The volume header on the tape volume may be analyzed. The volume header information may be used for the CRC matching. The hint in the VH may be a text string (which may include one or more dots "." in the text string) and/or numerical data. The VH hint may function and operate as a signature or "key" for searching, comparing, and matching each of the tape volumes. In an additional aspect, each character of the text string may be assigned a number (e.g., a numerical value). The numerical representation may be used as the signature or "key" for searching, comparing, and matching each of the tape volumes. The most closely related tape volumes may be placed into a common pool or "bucket" for searching according to the hint or the bucket. That is, only those tape volumes that have previously been identified and/or added within the bucket are used for comparison (e.g., only search common buckets for the matching). It should be noted that as used herein "hint" may refer to an arbitrary suggestion or relationship of a CRC and corresponding data that may be identified a current search that expedite the CRC matching used to identify matching tape volumes. The "hint" may be a string of text or numerical data that is used as a signature key for matching one or more tape volumes.

A searching operation may be performed on each VH. For example, the first character of the text string may be searched for in the VH. Alternatively, one or more various combinations or groupings of the characters of the text string that may be searched. Additionally, analyzing the volume header on the tape may also include using a "first byte" value of the volume header, which may result in a 50:1 reduction in tape volumes to consider. However, analyzing the volume header on the tape may include using more bytes than just the "first byte". The volume header fields may also be parsed, searching for one or more hints such as, for example, a user dataset naming convention such as "myfile.backup.whatever". The metadata in the VH may be used to store the hint.

In summary, the VH hint or ("hint") may be used to assist a first tape volume associated with a machine to be able to identify at least one remote tape volume associated with a remote/alternative machine. Thus, the amount of data that needs to be copied or deduplicated on a VH depends on how close of a match or similarity.

Figure 7:
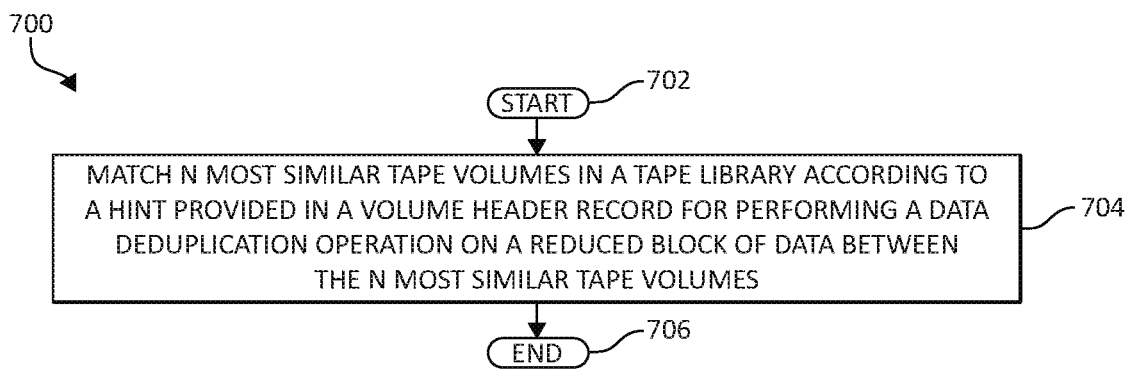
FIG. 7 is a flowchart diagram depicting an exemplary method for using volume header records to identify matching tape volumes in an automated data storage library in accordance with an embodiment of the present invention.

Turning now to FIG. 7, a method 700 for storing data in an automated data storage library is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702. N most similar tape volumes in a tape library may be matched N according to a hint provided in a volume header of a tape volume for performing a data deduplication operation on the reduced block of compressed data between the N most similar tape volumes, wherein N is a positive integer, as in block 704. In other words, the N most similar tape volumes in the tape library may be matched according to each hint provided in each volume header of a plurality of tape volumes for performing a data deduplication operation on a reduced block of compressed data between the N most similar tape volumes. The functionality 700 may end in block 706.

In one aspect, in conjunction with and/or as part of at least one block of FIG. 7, the operations of 700 may include each of the following. The operations of 700 may search the volume header to identify the hint (e.g., data indication or data hint), wherein the hint is a string of text, search a first byte of each hint of a plurality of tape volumes to identify the N most similar tape volumes, and/or search an X number of bytes of each hint of a plurality of tape volumes to identify the N most similar tape volumes.

The operations of 700 may represent each character of the hint as a numerical value. Numerical values of hints associated with each volume header of a plurality of tape volumes may be used as a signature to locate the N most similar tape volumes having a most similar signature to numerical values of a hint for a base or "first" volume header. The volume headers associated with each of the plurality of tape volumes may also be parsed for identifying the N most similar tape volumes having closest matching hints.

For example, a first tape volume may have the hint "1.2.3.4.5". A second tape volume may have the hint "1.2.3.4.6". A third tape volume may have the hint "4.2.9.8.7". A fourth tape volume may have the hint "1.2.3.4.9". In this example, the second tape having hint "1.2.3.4.6" and the fourth tape volume with the hint "1.2.3.4.9" are the closest matching tape volumes to the first tape volume with the hint "1.2.3.4.5". In other words, the numerical values of "1", "2", "3", and "4" are each identified as "matching". The third tape is eliminated as a matching tape volume. It should be noted that the matching three tape volumes (e.g., the first tape, the second tape, and the fourth tape) are used merely for illustrative purposes and not to be construed as limiting.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, by a processor, for data storage in a virtual tape server, comprising:
    searching a volume header of each of a plurality of tape volumes in a tape library to generate a candidate list of similar tape volumes; wherein each volume header of each of the plurality of tape volumes comprises a data indication that includes a plurality of characters in at least text strings and numerical data;
    comparing, a each of the data indications within each of the volume headers of the plurality of tape volumes to each other to identify the similar tape volumes to add to the candidate list;
    responsive to generating the candidate list, matching the similar tape volumes on the candidate list in the tape library according to a weak hash function comprising a cyclic redundancy check (CRC) that is applied to fixed-size data sections in each tape volume in the tape library to generate an aggregated weak hash function for each tape volume, wherein a plurality of CRC values of each of a plurality of the fixed-size data sections in each tape volume are aggregated together to generate the aggregated weak hash function for each tape volume;
    wherein a histogram of the aggregated weak hash function of a respective tape volume of the similar tape volumes on the candidate list is compared with histograms of alternative tape volumes of the similar tape volumes on the candidate list to determine N similar tape volumes in the tape library; and
    performing a data deduplication operation on a reduced block of compressed data between the N similar tape volumes in the tape library, wherein N is a positive integer.

2. The method of claim 1, further including searching a first byte of each data indication of each volume header of the plurality of tape volumes to identify the similar tape volumes to add to the candidate list.

3. The method of claim 1, further including searching an X number of bytes of each data indication of each volume header of the plurality of tape volumes to identify the similar tape volumes to add to the candidate list, wherein X is a positive integer.

4. The method of claim 1, further including creating a numerical representation of the data indication by assigning each character of the text strings of the data indication a numerical value.

5. The method of claim 4, further including using the numerical representation of the data indication associated with each volume header of the plurality of tape volumes as a signature to locate the similar tape volumes to add to the candidate list.

6. A system, for data storage in a virtual tape server associated with a tape library, comprising:
one or more processors with executable instructions that when executed cause the system to:
search a volume header of each of a plurality of tape volumes in a tape library to generate a candidate list of similar tape volumes; wherein each volume header of each of the plurality of tape volumes comprises a data indication that includes a plurality of characters in at least text strings and numerical data;
compare, each of the data indications within each of the volume headers of the plurality of tape volumes to each other to identify the similar tape volumes to add to the candidate list;
responsive to generating the candidate list, match the similar tape volumes on the candidate list in the tape library according to a weak hash function comprising a cyclic redundancy check (CRC) that is applied to fixed-size data sections in each tape volume in the tape library to generate an aggregated weak hash function for each tape volume, wherein a plurality of CRC values of each of a plurality of the fixed-size data sections in each tape volume are aggregated together to generate the aggregated weak hash function for each tape volume;
wherein a histogram of the aggregated weak hash function of a respective tape volume of the similar tape volumes on the candidate list is compared with histograms of alternative tape volumes of the similar tape volumes on the candidate list to determine N similar tape volumes in the tape library; and
perform a data deduplication operation on a reduced block of compressed data between the N similar tape volumes in the tape library, wherein N is a positive integer.

7. The system of claim 6, wherein the executable instructions further search a first byte of each data indication of each volume header of the plurality of tape volumes to identify the similar tape volumes to add to the candidate list.

8. The system of claim 6, wherein the executable instructions further search an X number of bytes of each data indication of each volume header of the plurality of tape volumes to identify the similar tape volumes to add to the candidate list, wherein X is a positive integer.

9. The system of claim 6, wherein the executable instructions further create a numerical representation of the data indication by assigning each character of the text strings of the data indication a numerical value.

10. The system of claim 9, wherein the executable instructions further use the numerical representation of the data indication associated with each volume header of the plurality of tape volumes as a signature to locate the similar tape volumes to add to the candidate list.

11. A computer program product for, by one or more processors, storing data in a virtual tape server, the computer program product comprising a non-transitory computer-readable storage medium having computer-readable program code portions stored therein, the computer-readable program code portions comprising:
an executable portion that searches a volume header of each of a plurality of tape volumes in a tape library to generate a candidate list of similar tape volumes; wherein each volume header of each of the plurality of tape volumes comprises a data indication that includes a plurality of characters in at least text strings and numerical data;
an executable portion that compares each of the data indications within each of the volume headers of the plurality of tape volumes to each other to identify the similar tape volumes to add to the candidate list;
an executable portion that, responsive to generating the candidate list, matches the similar tape volumes on the candidate list in the tape library according to a weak hash function comprising a cyclic redundancy check (CRC) that is applied to fixed-size data sections in each tape volume in the tape library to generate an aggregated weak hash function for each tape volume, wherein a plurality of CRC values of each of a plurality of the fixed-size data sections in each tape volume are aggregated together to generate the aggregated weak hash function for each tape volume;
wherein a histogram of the aggregated weak hash function of a respective tape volume of the similar tape volumes on the candidate list is compared with histograms of alternative tape volumes of the similar tape volumes on the candidate list to determine N similar tape volumes in the tape library; and
an executable portion that performs a data deduplication operation on a reduced block of compressed data between the N similar tape volumes in the tape library, wherein N is a positive integer.

12. The computer program product of claim 11, further including an executable portion that searches a first byte of each data indication of each volume header of the plurality of tape volumes to identify the similar tape volumes to add to the candidate list.

13. The computer program product of claim 11, further including an executable portion that searches an X number of bytes of each data indication of each volume header of the plurality of tape volumes to identify the similar tape volumes to add to the candidate list, wherein X is a positive integer.

14. The computer program product of claim 11, further including an executable portion that: creates a numerical representation of each data indication by assigning each character of the text strings of each data indication a numerical value; and uses the numerical representation of each data indication associated with each volume header of the plurality of tape volumes as a signature to locate the similar tape volumes to add to the candidate list.

* * * * *